United States Patent Office 3,410,607
Patented Nov. 12, 1968

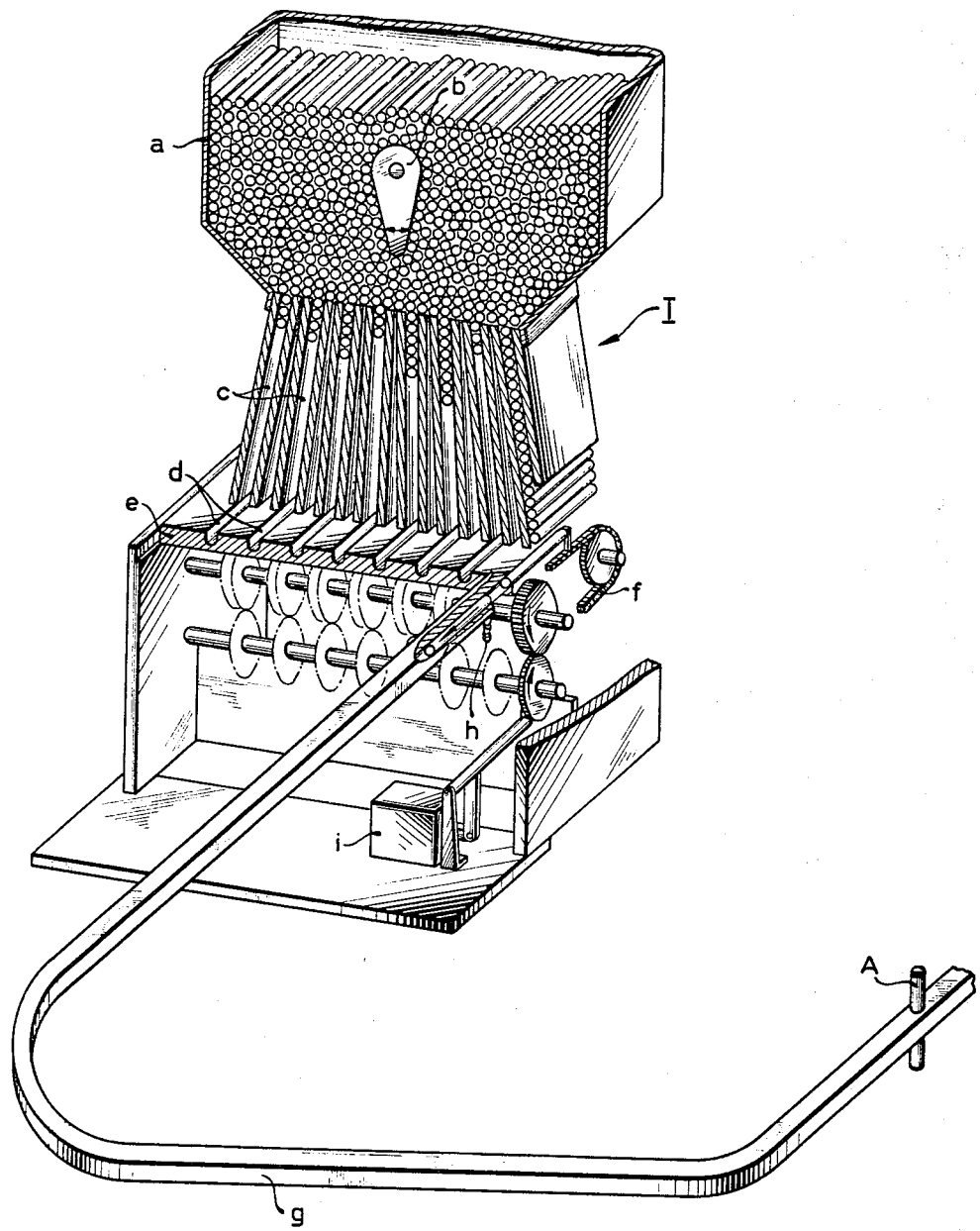

3,410,607
APPARATUS FOR FEEDING ROD-LIKE ARTICLES
Karl Tempel, Berlin, Germany, assignor to Molins Machine Company Limited, London, England, a corporation of Great Britain
Filed June 22, 1967, Ser. No. 648,142
Claims priority, application Germany, June 24, 1966, R 43,540
7 Claims. (Cl. 302—2)

ABSTRACT OF THE DISCLOSURE

In a pneumatic filter rod supply apparatus in which rods are supplied from a central station via pneumatic tubes to several cigarette-making machines, the machine hopper has a receiving chamber within it, into which rods are fed lengthwise from the tube, and from which the rods are pushed sideways into the mass of rods already in the hopper, in alternating directions, by an oscillating pusher.

Background to the invention

This invention concerns improvements in or relating to apparatus for feeding rod-like articles, such as filter rods for use in making filter cigarettes, into a container such as a hopper in a filter cigarette making machine.

It is common practice to accommodate filter rods, or other rod-like articles such as cigarettes, in hoppers in which they are arranged as a stack and from which they are fed down for further utilisation. For example a filter cigarette machine usually has a hopper for multiple-length filter rods which are withdrawn from the hopper in succession, cut into appropriate lengths, and assembled with cigarettes. Various proposals have been made for supplying rods to such a hopper by feeding them lengthwise in a direction parallel to the axes of the rods in the hopper, and this lengthwise feeding may be accomplished pneumatically, i.e. the rods are blown lengthwise through a tube or conduit towards the hopper. Such a system may be used to supply the hoppers of several machines from a central supply.

Summary of the invention

The present invention is particularly concerned with the provision of apparatus for feeding rod-like articles, such as filter rods, into a hopper.

According to the invention there is provided apparatus for feeding rod-like articles into a container in which the articles are contained as a stack, comprising feeding means to feed articles lengthwise in succession towards the container in a direction substantially parallel with the axes of articles in the container, an enclosed receiver within the container, at a position below the normal top level of the stack, to receive articles from said feeding means, and pusher means within the receiver to push successive articles sideways out of the receiver into the stack of articles in the container.

The pusher may be oscillated to push articles alternately in opposite directions into the stack. The receiver may include a pair of guide plates spaced apart to accommodate an article between them, which guide plates may be apertured to accommodate an oscillating pusher bar extending across the space between the plates.

The feeding means may be pneumatic and include a conduit for the articles, means to feed articles into the conduit, and means to supply air under pressure into the conduit to blow articles therethrough towards the container, the conduit extending substantially to the entrance to the receiver whereby articles are fed pneumatically into the receiver. The conduit may be of rectangular cross-section.

Further according to the invention there is provided a filter rod conveying and dispensing apparatus, comprising a hopper adapted to contain a stack of parallel rods, an outlet from said hopper, a rod-receiving chamber within said hopper so positioned that the said stack extends above and at both sides of the chamber, means to feed rods lengthwise in succession into said chamber in a direction substantially parallel with that of the rods in the stack, and pusher means within the chamber to engage successive rods and push them sideways in alternating directions out of the chamber and into the stack, the chamber being apertured to permit rods to be fed into it endwise and to be ejected from it sideways.

Brief description of drawings

Apparatus in accordance with the invention will now be described by way of example with reference to the accompanying drawings:

FIGURES 1a and 1b show a perspective view of the whole mechanism,

Description of the preferred embodiment

Figure 1B:
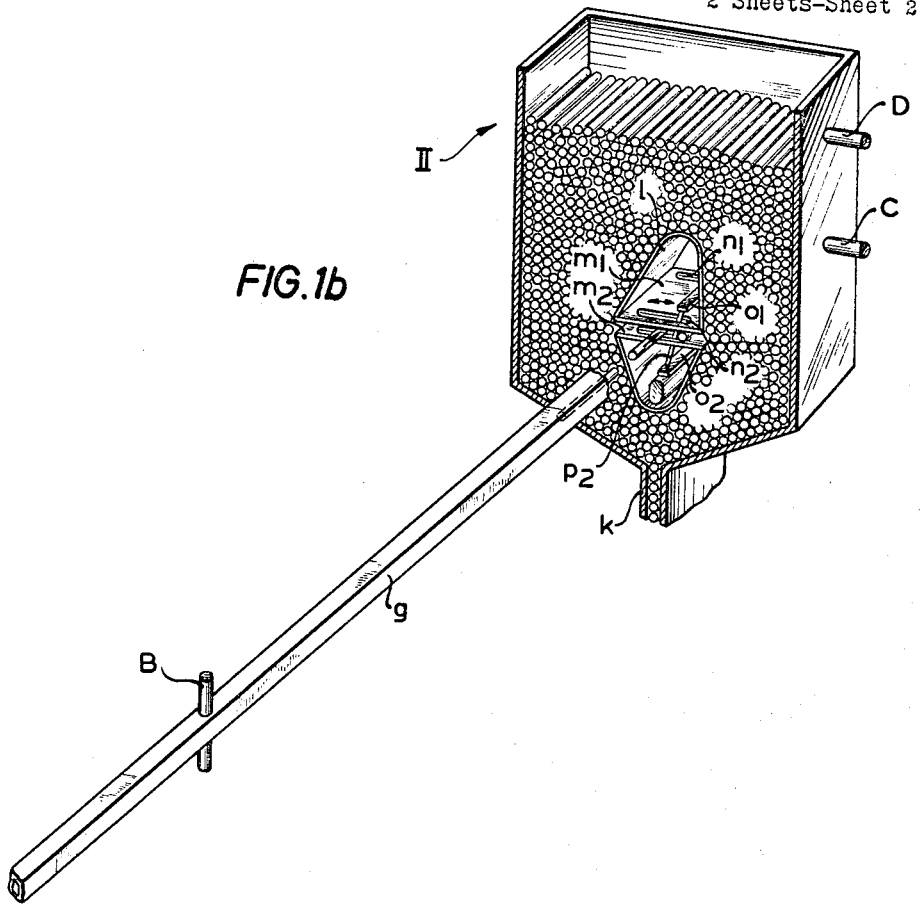

In FIGURE 1a, I denotes the central supply station for filter rods, and in FIGURE 1b. II denotes the filter rod hopper of a filter cigarette-making machine which is not shown. At the central supply station there is provided a main supply hopper $a$ for the filter rods. The hopper contains a guide $b$ arranged to move alternately in one direction or the other, as indicated by the arrows. Beneath the hopper are channels $c$ through which the filter rods drop into a corresponding number of grooves $d$ in a base plate $e$. The successive filter rods lying in each of the grooves are pushed endwise by successive pusher (not shown) carried by a chain $f$, into a conveyor tube $g$ of square cross-section, as shown in the drawing, and conveyed through this tube by means of compressed air injected at point $h$. A magnetic clutch $i$ controls the movement of the conveyor chain $f$, and acts to stop the chain when the downstream end of the tube $g$, adjacent the hopper II, contains a predetermined reserve of rods. This is determined by a light cell detector A which controls the operation of the clutch $i$ so as to stop the chain conveyor $f$ when the reserve of rods in the tube has built back as far as the detector A, and to start it when the reserve becomes smaller.

Figure 2:
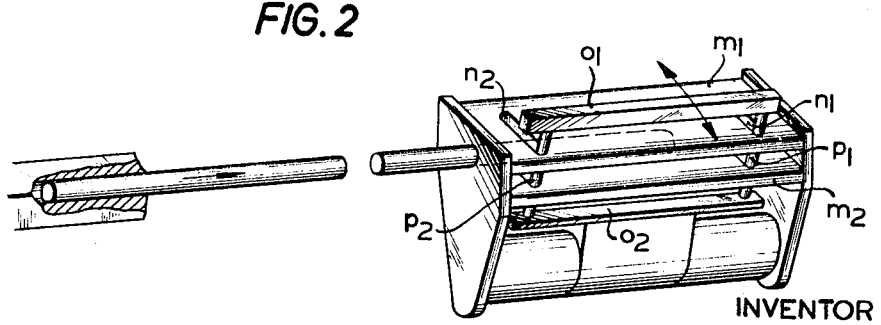
FIGURE 2 also shows a perspective view of the receiver of FIGURE 1 on a larger scale than in FIGURE 1.

Within the hopper II is mounted a receiver comprising a housing $l$, FIGURE 1b, which is normally surrounded by a stack of filter rods contained in the hopper. This housing is located directly above an outlet channel $k$ through which the rods leave the hopper to be utilised in the filter cigarette-making machine. Within the housing is a structure better shown in FIGURE 2, and comprising two horizontal plates $m^1$ and $m^2$, spaced apart a suitable distance to allow filter rods to pass between them. The downstream end of the conveyor tube $g$ leads directly towards the centre of the gap between these plates. A pair of oscillating pusher bars $p^1$ and $p^2$ extend through parallel slots $n^1$ and $n^2$ in the two plates and are connected to each other by cross-bars $o^1$ and $o^2$. The pusher bars are oscillated to and fro by suitable driving means which is so timed that filter rods which move endwise from the tube $g$ into the space between the plates are pushed sideways alternately to the right and to the left, into the stack of rods already in the hopper. The housing $l$ has apertures at either side to allow the filter rods to be pushed out sideways, and is also suitably apertured at the front to enable the rods to move lengthwise from the tube $g$ into the space between the two plates.

An additional light cell detector B is positioned between the detector A and the hopper II. This controls the operation of the pusher bars in the receiver, in such a way as to stop their operation if the supply of filter rods in the downstream end of the tube becomes so reduced that the reserve of rods does not extend back as far as the detector B.

Two light cell detectors are provided in the hopper II. The upper detector D acts to detect the upper level of the rods in the hopper and to stop the pusher bars in the receiver as soon as the level of the stack of rods in the hopper has risen up to or just beyond the detector D. A further light cell detector C, positioned below the detector D, is arranged to cause an optical or acoustic signal if the level of the filter rods in the hopper II drops below the level of the detector C. This detector may be so positioned as to cause the warning signal at a time when the hopper still contains enough rods to allow the filter cigarette making machine to continue to operate for a given period, for example six minutes. Thus if the fall in the level of rods in the hopper is due to a stoppage of the feed from the supply hopper I, the hopper II can if desired be replenished by placing additional filter rods in the hopper from above, manually or otherwise, if it is not possible to clear the stoppage of the feed in time.

The rates of feed from the hopper I into the tube, and into the hopper II from the receiver, are both greater than the rate at which the rods are withdrawn from the hopper II for consumption by the filter cigarette making machine, so as to enable a suitable reserve of rods to be built up and maintained both in the hopper and in the tube.

By pushing the rods sideways into the stack of rods in the hopper, it is possible to ensure that the rods have little or no opportunity of becoming misaligned.

It will also be appreciated that the oscillating pusher device, in addition to the fact that it has no idle stroke, has the advantage of pushing the rods into the stack at both sides of the hopper, so that the height of the stack increases more uniformly across the width of the hopper than would be the case if the rods were inserted at one side only.

The above description and the accompanying drawings disclose only one hopper for a single cigarette-making machine, and only one tube for feeding that hopper. It will be understood, of course, that a similar tube may be provided for each of the channels c beneath the main supply hopper I, each tube serving to supply the hopper of a separate cigarette-making machine.

What I claim as my invention and desire to secure by Letters Patent is:

1. Apparatus for feeding rod-like articles into a container in which the articles are contained as a stack, comprising feeding means to feed articles lengthwise in succession towards the container in a direction substantially parallel with the axes of articles in the container, an enclosed receiver within the container, at a position below the normal top level of the stack, to receive articles from said feeding means, and pusher means within the receiver capable of being oscillated to alternately push successive articles sideways in opposite directions out of the receiver into the stack of articles in the container.

2. Apparatus according to claim 1, wherein the receiver includes a pair of guide plates spaced apart to accommodate an article between them.

3. Apparatus according to claim 2, wherein the guide plates are apertured to accommodate an oscillating pusher bar extending across the space between the plates.

4. Apparatus according to claim 1, wherein the feeding means are pneumatic and include a conduit for the articles, means to feed articles into the conduit, and means to supply air under pressure into the conduit to blow articles therethrough towards the container, the conduit extending substantially to the entrance to the receiver whereby articles are fed pneumatically into the receiver.

5. Apparatus according to claim 4, wherein the conduit is of rectangular cross-section.

6. Apparatus according to claim 4, wherein the operation of the pusher means in the receiver is controlled in response to detector means which detect the quantity of articles in the container and the quantity of articles in the conduit adjacent the receiver.

7. A filter rod conveying and dispensing apparatus, comprising a hopper adapted to contain a stack of parallel rods, an outlet from said hopper, a rod-receiving chamber within said hopper so positioned that the said stack extends above and at both sides of the chamber, means to feed rods lengthwise in succession into said chamber in a direction substantially parallel with that of the rods in the stack, and pusher means within the chamber to engage successive rods and push them sideways in alternating directions out of the chamber and into the stack, the chamber being apertured to permit rods to be fed into it endwise and to be ejected from it sideways.

References Cited

UNITED STATES PATENTS

| | | | |
|---|---|---|---|
| 3,222,110 | 12/1965 | Kelly et al. | 302—2 |
| 3,336,085 | 8/1967 | Strydom | 302—2 |

ANDRES H. NIELSEN, *Primary Examiner.*